US006741019B1

(12) United States Patent
Filas et al.

(10) Patent No.: US 6,741,019 B1
(45) Date of Patent: May 25, 2004

(54) ARTICLE COMPRISING ALIGNED NANOWIRES

(75) Inventors: Robert William Filas, Bridgewater, NJ (US); Sungho Jin, Millington, NJ (US); Gregory Peter Kochanski, Dunellen, NJ (US); Wei Zhu, Warren, NJ (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/420,157

(22) Filed: Oct. 18, 1999

(51) Int. Cl.[7] ................ H01J 1/30; H01J 9/02
(52) U.S. Cl. ............. 313/355; 313/309; 313/311; 313/351; 313/495; 445/24
(58) Field of Search ................ 313/309, 308, 313/306, 495, 351, 355, 311; 445/24

(56) References Cited

U.S. PATENT DOCUMENTS

| | | | |
|---|---|---|---|
| 4,940,916 A | | 7/1990 | Borel et al. |
| 5,129,850 A | | 7/1992 | Kane et al. |
| 5,138,237 A | | 8/1992 | Kane et al. |
| 5,191,217 A | * | 3/1993 | Kane et al. ............... 250/423 F |
| 5,283,500 A | | 2/1994 | Kochanski |
| 5,456,986 A | * | 10/1995 | Majetich et al. ............. 428/403 |
| 5,681,196 A | | 10/1997 | Jin et al. |
| 5,698,934 A | | 12/1997 | Jin et al. |
| 5,726,524 A | * | 3/1998 | Debe ......................... 313/309 |
| 5,872,422 A | | 2/1999 | Xu et al. ..................... 313/311 |
| 5,973,444 A | * | 10/1999 | Xu et al. ..................... 313/309 |
| 6,020,677 A | * | 2/2000 | Blanchet-Fincher et al. ......................... 313/336 |
| 6,057,637 A | * | 5/2000 | Zettl et al. ................... 313/310 |
| 6,062,931 A | * | 5/2000 | Chuang et al. ................ 445/24 |
| 6,129,901 A | * | 10/2000 | Moskovits et al. ........ 423/447.3 |
| 6,232,706 B1 | * | 5/2001 | Dai et al. ..................... 313/309 |
| 6,250,984 B1 | * | 6/2001 | Jin et al. ...................... 445/51 |

FOREIGN PATENT DOCUMENTS

| | | | |
|---|---|---|---|
| DE | 4405768 A1 | 2/1994 | |
| JP | 2000208028 | * 7/2000 | ............ H01J/1/304 |

OTHER PUBLICATIONS

Scott, A.W., *Understanding Microwaves*, Ch. 12, John Wiley & Sons (1993).
*Semiconductor International*, p. 46 (1991).
Spindt, C.A. et al., "Field–Emitter Arrays for Vaccum Microelectronics", *IEEE Transactions on Electron Devices*, vol. 38, 2355 (1991).
*Advances in Electronics and Electron Physics*, edited by Peter W. Hawkes, vol. 83, p. 75 (1992).
Costellano, J.A., *Handbook of Display Technology*, Academic Press, p. 254 (1992).
Rinzler, et al., "Unraveling Nanotubes: Field Emission from an Atomic Wire", *Science*, vol. 269, 1550 (1995).
DeHeer et al., "A Carbon Nanotube Field–Emissin Electron Source", *Science*, vol. 270, 1179 (1995).

(List continued on next page.)

Primary Examiner—Nimeshkumar D. Patel
Assistant Examiner—Sikha Roy
(74) Attorney, Agent, or Firm—Harness, Dickey & Pierce, P.L.C.

(57) ABSTRACT

An improved process for fabricating emitter structures from nanowires, wherein the nanowires are coated with a magnetic material to allow useful alignment of the wires in the emitter array, and techniques are utilized to provide desirable protrusion of the aligned nanowires in the final structure. In one embodiment, nanowires at least partially coated by a magnetic material are provided, the nanowires having an average length of about 0.1 $\mu$m to about 10,000 $\mu$m. The nanowires are mixed in a liquid medium, and a magnetic field is applied to align the nanowires. The liquid medium is provided with a precursor material capable of consolidation into a solid matrix, e.g., conductive particles or a metal salt, the matrix securing the nanowires in an aligned orientation. A portion of the aligned nanowires are exposed, e.g., by etching a surface portion of the matrix material, to provide desirable nanowire tip protrusion.

22 Claims, 5 Drawing Sheets

OTHER PUBLICATIONS

Saito, et al., "Cathode Ray Tube Lighting Elements with Carbon Nanotube Field Emitters", *Jpn. J. Appl. Phys.*, vol. 37, L346 (1998).

Wang et al., "A nanotube–based field–emission flat panel display", *Appl. Phys. Lett.*, vol. 72, No. 22 2912 (1998).

Wang, Q. H. et al., "Field emission from nanotube bundle emitters at low fields", *Appl. Phys. Lett.* 70 (24), pp. 3308–3310 (1997).

Yakobson, B.I. et al., "Fullerene Nanotubes: $C_{1,000,000}$ and Beyond" *American Scientist*, vol. 85 p. 324 (1997).

Bonard, J–M. et al., "Field emission from single–wall carbon nanotube films", *Appl. Phys. Lett.*, vol. 73, No. 7, pp. 918–920 (1998).

Bonard, J–M. et al., "Field–Emission–Induced Luminescence from Carbon Nanotubes", *Physical Review Lett.*, vol. 81, No. 7, pp. 1441–1444 (1998).

Collins, P.G. et al., "Unique characteristics of cold cathode carbon–nanotube–matrix field emitters" *Physical Review* B, vol. 55, No. 15, p. 9391 (1997).

Collins, P.G. et al., "A simple and robust electron beam source from carbon nanotubes", *Appl. Phys, Lett.* No. 69 (13) pp. 1969–1971 (1996).

Saito, Y. et al. "Field Emission Patterns from Single–Walled Carbon Nanotubes", *Jpn. J. Appl. Phys.* vol. 36 (1997).

*Semiconductor International*, p. 44 (1998).

Li, W.Z. et al., "Large–Scale Synthesis of Aligned Carbon Nanotubes", *Science*, vol. 274, pp. 1701–1703 (1996).

Ren, Z.F. et al. "Synthesis of Large Arrays of Well–Aligned Carbon Nanotubes on Glass," *Science*, vol. 282, pp. 1105–1107 (1998).

De Heer, W.A. et al., "Aligned Carbon Nanotubes Films: Production and Optical and Electronic Properties", *Science*, vol. 268, pp. 845–847 (1995).

Biggs, S. et al., "Surfactant and Polymer Adsorption: Atomic Force Microscopy Measurements," *American Chemical Society* ACS Symposium Series 615, Chapter 17, p. 255 (1995).

"Surfactant Science and Technology," Drew Myers, VCH Publishers, Inc., (1998).

"Amphoteric Surfactants," Second Edition, Eric G. Lomax, Ed., Marcel Dekker, (1996).

Cullity, B.D., "Introduction to Magnetic Materials", Addison–Wesley, p. 410 (1972).

Terrones, M. MRS Bulletin vol. 24, No. 8, p. 43 (1999).

* cited by examiner

ARTICLE COMPRISING ALIGNED NANOWIRES

BACKGROUND OF THE INVENTION

1. Field of the Invention

This invention pertains to devices comprising nanowires, in particular, field emitter structures.

2. Discussion of the Related Art

Electron field emitters are useful for a variety of applications including microwave-amplifiers and flat-panel, field-emission displays.

Microwave vacuum tube devices, such as power amplifiers, are essential components of many modern microwave systems including telecommunications, radar, electronic warfare, and navigation systems. While semiconductor microwave amplifiers are available, they generally lack the power capabilities required by most microwave systems. Microwave tube amplifiers, in contrast, provide microwave energy at much higher power levels. The higher power levels of tube devices are the result of the fact that electrons travel at a much higher velocity in a vacuum than in a semiconductor. The higher speed permits use of larger structures with the same transit time. Larger structures, in turn, permit greater power levels.

Microwave tube devices typically operate by introducing a beam of electrons into a region where the beam interacts with an input signal, and then deriving an output signal from the modulated electron beam. See, e.g., A. W. Scott, *Understanding Microwaves*, Ch. 12, John Wiley & Sons (1993), the disclosure of which is hereby incorporated by reference. Microwave tube devices include traveling wave tubes, gridded tubes, klystons, cross-field amplifiers and gyrotrons. The usual source of electrons for microwave tube devices is a thermionic emission cathode, typically formed from tungsten cathodes, optionally coated with barium oxide or mixed with thorium oxide. The cathode is heated to a temperature around 1000° C. to produce thermionic electron emission on the order of amperes per square centimeter.

The requisite heating of thermionic cathodes causes a number of problems. Cathode lifetime is limited because key constituents of the cathode, such as barium oxide, evaporate under the high operating temperatures, and when the barium is depleted, the cathode (and hence the tube) no longer perform. Many traveling wave tubes (TWTs), for example, have operating lives of less than a year. Also, the need to raise the cathode to the operating temperature causes emission delays of up to several minutes, which is not acceptable for most commercial applications. In addition, the high temperature operation generally requires a peripheral cooling system, such as a fan, thereby increasing the size of the overall device or system. It would therefore be desirable to develop microwave tube devices that do not require such high temperature operation, e.g., cold cathode devices.

Another promising application of field emitters is thin, matrix-addressable, flat panel displays. See, for example, *Semiconductor International*, December 1991, p.46; C. A Spindt et al., *IEEE Transactions on Electron Devices*, Vol. 38, 2355 (1991); I. Brodie and C. A. Spindt, *Advances in Electronics and Electron Physics*, edited by P. W. Hawkes, Vol. 83, pp. 1 (1992); and J. A Costellano, Handbook of Display Technology, Academic Press, 254 (1992); and U.S. Pat. Nos. 4,940,916; 5,129,850; 5,138,237 and 5,283,500, the disclosures of which are hereby incorporated by reference.

A variety of characteristics are known to be advantageous for cathode materials of field emission devices. The emission current is advantageously voltage controllable, with driver voltages in a range obtainable from "off the shelf" integrated circuits. For typical device dimensions (e.g. 1 $\mu$m gate-to-cathode spacing), a cathode that emits at fields of 25 V/$\mu$m or less is generally desirable for typical CMOS circuitry. The emitting current density is advantageously in the range of 1–10 mA/cm$^2$ for flat panel display applications and >100 mA/cm$^2$ for microwave power amplifier applications. The emission characteristics are advantageously reproducible from one source to another and advantageously stable over a very long period of time (tens of thousands of hours). The emission fluctuations (noise) are advantageously small enough to avoid limiting device performance. The cathode is advantageously resistant to unwanted occurrences in the vacuum environment, such as ion bombardment, chemical reaction with residual gases, temperature extremes, and arcing. Finally, the cathode manufacturing is advantageously inexpensive, e.g. no highly critical processes and adaptable to a wide variety of applications.

Conventional field emission cathode materials are typically made of metal (such as Mo) or semiconductor material (such as Si) with tips of submicron size. While useful emission characteristics have been demonstrated for these materials, the control voltage required for emission is relatively high (around 100 V) because of their high work functions and insufficiently sharp tips. This high voltage operation increases the damaging instabilities due to ion bombardment and surface diffusion on the emitter tips and necessitates high power densities to be supplied from an external source to produce the required emission current density. The fabrication of uniform tips is difficult, tedious and expensive, especially over a large area. In addition, the vulnerability of these materials to conditions of a typical operating environment, e.g., ion bombardment, reaction with chemically active species, and temperature extremes, is of concern.

Carbon materials (diamond and carbon nanotubes) have recently emerged as potentially useful electron field emitters. Diamond offers advantages due to the negative or low electron affinity on its hydrogen-terminated surfaces, but the technological advances have been somewhat slow because of emission non-uniformity and the tendency for graphitization in diamond emitters at increased emission currents, e.g., above about 30 mA/cm$^2$.

Carbon nanotubes feature a high aspect ratio (>1,000) and a small tip radii of curvature (~5–50 nm). These geometric characteristics, coupled with the high mechanical strength and chemical stability of the tubules, make carbon nanotubes attractive as electron field emitters. See, e.g., German patent No. 4,405,768; Rinzler et al., *Science*, Vol. 269, 1550 (1995); De Heer et al., *Science*, Vol. 270, 1179 (1995); Saito et al., *Jpn. J. Appl. Phys.*, Vol. 37, L346 (1998); Wang et al., *Appl. Phys. Lett.*, Vol. 70, 3308 (1997); Saito et al., *Jpn. J. Appl. Phys.*, Vol. 36, L1340 (1997); and Wang et al., *Appl. Phys. Lett.*, Vol. 72, 2912 (1998), the disclosures of which are hereby incorporated by reference. However, carbon nanotubes are typically available in the form of needle-like or spaghetti-like powders which are not easily or conveniently incorporated into a field emitter device structure. And due to this random configuration, the electron emission capabilities are not fully utilized. In addition, adherence of thin film nanotubes to a conductive substrate is problematic because the nanotube material is usually free of dangling bonds and high energy sites, making chemical bonding to the substrate difficult. Other types of nano-scale wires with small diameters also exist. Semiconductor or metallic nanowires of silicon or germanium, for example, are capable of being fabricated by a number of different methods including laser processing, vapor-liquid approach or CVD deposition. See, e.g., A. M. Morales and C. M. Lieber, *Science*, Vol. 279,:208 (1998); A. J. Read et al., *Phys. Rev. Lett.*, Vol. 69, 1232 (1992); J. Westwater et al., *J. Vac. Sci. Technol.*, Vol. B15, 554 (1997); and T. J. Trentler et al., *Science*, Vol. 270, 1791 (1995). However, whether such nanowires are capable of successful incorporation in field emission structures is not clear. (As used herein, nanowires indicates wires having average diameters ranging from about 0.5 nm to about 50 nm and aspect ratios of about 100 to about 10,000.)

Fabrication techniques for obtaining useful nanowire emission structures are therefore desired.

SUMMARY OF THE INVENTION

The invention provides an improved process for fabricating emitter structures from nanowires. Specifically, the nanowires are coated with a magnetic material to allow useful alignment of the wires in the emitter array, and techniques are utilized to provide desirable protrusion of the aligned nanowires in the final structure. (Aligned indicates that the average deviation from perfect alignment normal to the supporting surface, at the point on the surface from which the nanotube protrudes, is less than 45°, as determined, for example, using high-resolution scanning electron microscopy.) In one embodiment, nanowires at least partially coated by a magnetic material are provided, the nanowires having an average length of about 0.1 $\mu$m to about 10,000 $\mu$m. The nanowires are mixed in a liquid medium, and a magnetic field is applied to align the nanowires. The liquid medium is provided with a precursor material capable of consolidation into a solid matrix, e.g., conductive particles or a metal'salt, the matrix securing the nanowires in an aligned orientation. A portion of the aligned nanowires are exposed, e.g., by etching a surface portion of the matrix material, to provide an average protrusion of at least twice the average diameter of the nanowires. Advantageously, a substrate is provided during the alignment step such that one end of each nanowire is pulled to and against the substrate by the magnetic field, thereby orienting the tips of the nanowires substantially along a single plane (see, e.g., FIGS. 1E and 1F).

The resultant structure offers several advantageous properties. The protrusion offers improved field emission; the intermixing of nanowires with a matrix material to form a composite provides a relatively high density of nanowire tips compared to other formation techniques; nanowires of relatively uniform height, which increases the number of nanowires participating in emission; and the composite material offers relatively stable electrical and mechanical contact between the emitters and the underlying metal cathode. Moreover, all these advantages are attained by a straightforward process readily adaptable to a variety of commercial applications.

DETAILED DESCRIPTION OF THE INVENTION

Nanowire Structure and Fabrication Method

Figure 1A:
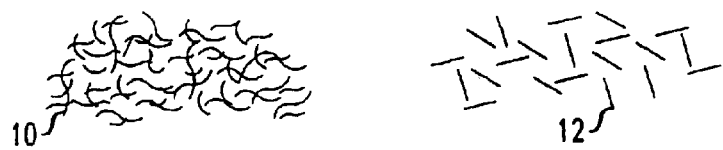
FIGS. 1A–1F illustrate an embodiment for fabricating a field emitter structure according to the invention.

In design and fabrication of efficient, powerful, and reliable field emitters, high values for three parameters are generally sought: emitter density, field-concentrating structure, and the stability of emitter-to-electrode contact. The role of these parameters are as follows.

High emission current density is desirable, and is capable of being attained by increasing the density of nanowires on the emitter surface. Care should be taken, however, so as not to increase the density too much and excessively reduce the field-concentrating effect of the elongated nanowire geometry. Providing a high-density of nanowires on an emitter surface has been relatively difficult, in part because nanowires generally resemble an aggregate of loosely-tangled needles or spaghetti-shaped wires of non-uniform height, and in part due to the problems of attaching nanowires to a conducting substrate.

Electron field emission is enhanced when the geometrical feature of the emitter is made small, due to the concentration of electrical field near sharp tips. Nanowires small diameter, e.g., as small as 1.3 nm, provides an effective field concentrating feature. However, the ends of the nanowires, especially if broken, provide even smaller radii of curvature for enhanced field concentration and electron emission. In fact, electron emission from nanowire tips is easier than emission from the sides, e.g., tip emission occurs at much lower field levels. It is thus advantageous to form a nanowire field emitter structure having an increased number of nanowire ends exposed, advantageously where ends point toward the anode. However, the nanowire tip, if embedded in a conductive material (i.e., completely surrounded by the material except for the tip), does not provide the desired field concentration. For example, if a composite structure consisting of nanowire and a metal matrix is utilized, the nanowires are advantageously made to protrude beyond the surface of the composite structure by at least about the dimension of the tip radius of curvature, in order to have the desired field concentration effect. For enhanced field emission, it is advantageous for the nanowires to protrude by much more than the tip radius, to increase the field concentration and induce useful levels of emission at lower applied fields that current emitters. Excessive protrusion, however, is not desirable due to increased electrical resistance (i.e., increased difficulty of electron supply) from the conductive matrix to the nanowire ends. In addition, the longer the protrusion, the higher the likelihood of encountering a structural defect, e.g., a high resistivity region, along the nanowire length. Generally, the length of protrusion is therefore less than 10 μm, more advantageously less than 1 μm.

Another important structural feature of a nanowire field emitter having protruding nanowires is the height of the tips from the surface of the substrate. The uniformity of protrusion is important in order to increase the number of nanowire tips participating in emission. Specifically, because of the shielding of local electrical field by the highest protruding tips, the contribution to the field emission would be dominated by these highest tips, with nearby, less protruding, tips making a reduced contribution. Thus, the average variation in protrusion is advantageously less than a factor of two.

In addition to high current density and electron field emission, stable electrical and mechanical contact of the nanowire emitters to the cathode electrode is desired. Such stable contact provides efficient electron transport to the emitter surface with low resistive heating, and also improves the reliability of the emitter structure, e.g., by providing sufficient heat dissipation from the emitting nanowires. This is particularly important for commercial applications, where there exist unavoidable, repeated interface stresses, induced, for example, by thermal expansion mismatch of materials involved during ambient temperature fluctuation or during repeated on-off operation of the field emitter device.

For these reasons, the nanowire field emitters of the invention have structure that provides improved emitter density, emission current density, electrical contact, and reliability, along with an aligned tip structure and desirable wettability to an electrically-conducting matrix. The fabrication of the emitter structures is as follows.

FIGS. 1A–1F illustrate one embodiment for fabricating a field emitter structure containing magnetically aligned nanowires. The first step is to provide nanowires such as carbon nanotubes or semiconductor nanowires by any of the known synthesis techniques as described earlier. It is possible for such nanowires to exhibit long, tangled configurations 10 or relatively short and straight configurations 12, as illustrated in FIG. 1A. Carbon nanotubes, for example, are prepared by a number of different synthesis techniques including arc discharge, chemical vapor deposition, and laser ablation. Single wall nanotubes exhibit a typical diameter on the order of 1 to 5 nm, and are often made in the form of a bundle. Multi-wall nanotubes contain many concentric graphite cylinders and exhibit a typical diameter on the order of 10 to 50 nm. The aspect ratio for both types is typically 100 to 10,000, and both types tend to have sharp, field-concentrating tips useful for electron field emission. Silicon and germanium nanowires are capable of being formed with comparable geometric features, as discussed above. Long, spaghetti-type wires, for the purpose of efficient magnetic alignment, are advantageously broken up into manageable lengths, e.g., an average length of less than about 100 μm, advantageously less than about 10 μm, such as by grinding, sonication, or acid etching, prior to the coating with a magnetic layer. These lengths are desired for each embodiment described herein. (Alternatively, it is possible for the nanowires to be coated with magnetic material first, as discussed herein, and then mechanically broken up into such lengths.)

Figure 1B:
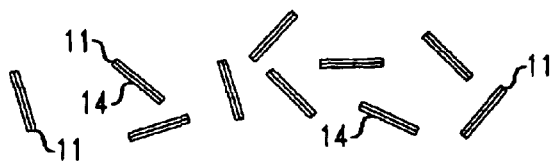

The next step, reflected in FIG. 1B, is to coat the nanowires 11 with a magnetic material 14. (Magnetic material indicates a material with a saturation magnetization of at least 100 Gauss.) Strongly magnetic materials such as ferromagnetic materials (e.g., Co, Fe, Ni and their alloys with various elements) or ferrimagnetic materials (e.g., ferrites containing Fe, Co, Ni, Zn, Mn, Ba, Sr and other elements) are advantageous, due to their relatively high saturation magnetization, e.g., 100 to 24,000 Gauss. It is possible for the magnetic coating to be applied to the nanowire surface by a number of different techniques, including electroless plating, electroplating, physical vapor deposition (e.g., evaporation, sputtering) and chemical vapor deposition. The desired average thickness of the magnetic coating is at least 0.1 nm, advantageously at least 0.5 nm. In order to reduce sticking among the nanowires, and to increase the nanowire volume fraction in the final aligned structure, the thickness of the coating is selected such that the relative amount of the magnetic coating material comprises less than about 0.95 in volume fraction, advantageously less than 0.75 in volume fraction of the coated nanowire. In the case of single walled nanotubes (SWNTs) of carbon which are often synthesized in a bundle form, the magnetic coating is applied to the surface of the overall bundle structure. If the SWNTs are separated from the bundle configuration into individual nanotubes, e.g., by chemical etching in aqueous solution or by other means, the magnetic coating can be applied to the surface of individual nanotubes.

For magnetic alignment, it is not necessary for the coating to cover the entire circumferential surface of the entire length of the nanowires. As long as a continuous length on part of the wire surface is covered, e.g., as is typically achieved in line-of-sight thin film deposition such as evaporation or sputtering, the nanowires are able to respond to a uniaxial magnetic field and thereby form an aligned structure. It is desirable to have at least 25% of the nanowire length continuously coated with the magnetic layer (not necessarily covering the entire circumference) for imparting the desired magnetic shape anisotropy for such field alignment.

Figure 1C:
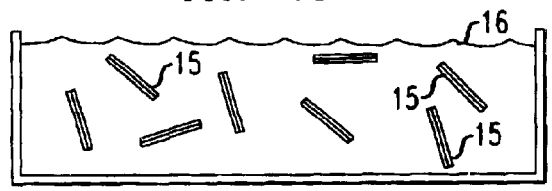

The next step, reflected in FIG. 1C, is to disperse the magnetic-coated nanowires 15 in a low-viscosity liquid medium 16 by mixing and vigorous stirring. Both aqueous and non-aqueous (e.g., alcohol or acetone) liquid media are suitable. It is possible to include a dissolved binder or adhesive material (e.g., polyvinyl alcohol) in such media. The amount of the binder or adhesive material present is typically in the range of 0.1–40 vol. %, advantageously 0.5–20 vol. %, in the finished aligned composite structure. Typically a precursor capable of being formed into a conductive material is included in the medium 16. (Conductive material indicates that, after consolidation, the material exhibits an electrical resistivity less than about 1000 ohm-cm.) For example, it is possible to use an aqueous solution with one or more water-soluble metal salts dissolved, such as $CuCl_2$, $CuSO_4$, $AgNO_3$, $SnCl_2$, $InCl_3$, or $FeCl_3$, such salts capable of being later decomposed to provide an electrically conductive and mechanically secure medium for the nanowires. It is further possible to use a solvent-based solution containing at least one electrically conductive polymer, e.g., intrinsically-conductive polymers or metal-filled conductive polymers. The polymer, after the nano wires are aligned and the solvent is evaporated away, similarly provides an electrically conducting and mechanical secure medium. Other additives are also possible. It is possible to initially mix the nanowires only with water or a nonaqueous solvent. In such a case, suitable binder/adhesive material and/or precursor material which provides the electrical conductivity after decomposition are slowly and carefully added after magnetic alignment and after partial or complete evaporation of the liquid carrier, preferably with the aligning field still present. Precursor materials providing matrix conductivity include conductive polymers, a metal-salt solution, or molten metal.

By using a relatively large volume fraction of nanowires with insulating binder or adhesive, it is also possible to induce the necessary physical and electrical contacts among the nanowires without the need for a conductive matrix material. Such contacts are substantially enhanced in the presence of magnetic field because of magnetic interaction and agglomeration often encountered when the particle size is small and the volume fraction is high. This connected aggregate of predominantly aligned nanowires is locked in place by the dried binder or adhesive material upon solvent removal.

Depending on the nature of the metal coating, the liquid in which the nanowires are dispersed or processed, and the method of coating used, nanowires may exhibit a varying degree of tendency to agglomerate into larger size aggregates. In such cases, to reduce undesirable, excessive agglomeration, one or both of the following approaches are useful: high-energy, high-speed shear mixing or appropriate surfactants.

The use of high-speed shear mixing of viscous medium containing the metal-coated nanowires, e.g., by employing rapidly rotating stirrer blades, tends to break up the agglomerated particle aggregates into individual nanowires or smaller aggregates. The magnetic alignment process is desirably applied immediately after the shear mixing before appreciable agglomeration takes place again.

The other approach to prevent nanowire agglomeration is to use surfactant molecules to coat the surface of the metal and provide a repelling force between fibers. For example, the cationic surfactant cetyltrimethylammonium bromide (CTAB) is known to adsorb and form a coating on gold surfaces at concentrations above the critical micelle concentration, leading to an electrostatic stabilization of the surface. (See "Surfactant and Polymer Adsorption: Atomic Force Microscopy Measurements," S. Biggs and P. Mulvaney, in ACS Symposium Series 615, Chapter 17, p. 255, Ravi Sharma, Ed., American Chemical Society, 1995.) In order to improve the situation for adsorpton, one end of the surfactant molecule should be chosen to have an affinity for the metal (e.g. Ni—P or Au). For example, sulfur or phosphorous atoms are known to be attracted to a gold surface because of the non-bonding electron pair on them, so the incorporation of such a heteroatom in the surfactant might be advantageous. A typical sulfur-containing group is a thiol (—SH).

One problem with using an organic coating to stabilize a suspension of nanowires is that the coating is insulating. It would therefore be useful for the surfactant to be composed completely of atoms which could be pyrolyzed without leaving a residue. If the coating is able to be removed cleanly, the metallized nanowire can be embedded in a solder such that a good electrical connection between the solder matrix and the nanowires established. This guideline would prohibit use of anionic surfactants that contain a metal counter-ion and cationic surfactants with stable anions, such as sulfate, which does not form a volatile acid. For example, sodium dodecyl sulfate would be difficult to eliminate by pyrolysis because it has both a metal ion and a sulfate group. From the standpoint of low-temperature thermal decomposition of ionic surfactants, in general a combination of an "onium" cation (e.g. phosphonium, sulfonium, ammonium) and an anion, X—, which can form a volatile acid (e.g. Cl—, Br—, $CH_3SO_3$—, $CF_3SO_3$—) would be desirable: R-onium $^+$X—, where R is a typical surfactant hydrophobic group and might contain a heteroatom such as sulfur or phosphorous. CTAB is an example of this case without the heteroatom.

Amphoteric surfactants have both anionic and cationic groups and in general will be soluble over wide pH limits in aqueous solution. (See "Amphoteric Surfactants," Second Edition, Eric G. Lomax, Ed., Marcel Dekker, 1996.) An example of an amphoteric surfactant is a betaine:

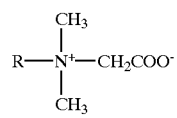

Analogous structures exist with the ammonium ion being substituted by a sulfonium or phosphonium ion. Similarly, if the nitrogen is not quaternized, the following could be used:

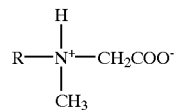

This modified compound is expected to thermolyze at lower temperature than the above betaine. By moving the R- group to the α-carbon, an amino acid is formed which is also expected to be useful:

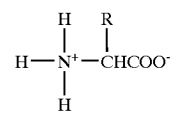

Alternatively, nonionic surfactants also solubilise over the entire pH range and do not require counter-ions for water solubility. (See "Surfactant Science and Technology," Drew Myers, VCH Publishers, Inc., 1988.) Typical structures include polyoxyethylenes and polyglycerols with general structures, respectively, of $RX(CH_2CH_2O)_nH$ and $RX(CH_3H_5OH)_nOH$, where X=O, N, etc., and R is as above.

Ultrafine magnetic particles and wires sometimes tend to agglomerate in a liquid medium because of magnetic attractions, since appreciable remanent magnetization is sometimes present in single-domain or near single-domain magnetic structures. In order to reduce such magnetic agglomerations, an embodiment of the invention includes the use of superparamagnetic magnetic coating structure, instead of ferromagnetic or ferrimagnetic coating structure described earlier. The use of paramagnetic coating is also contemplated. However, high (and typically impractical) magnetic fields are generally required to align such paramagnetic coated nanowires.

Superparamagnetic phenomenon is caused by thermally induced instability of magnetization, and is characterized by the absence of both magnetic coercivity and remanent magnetization, the presence of which is the very cause of magnetic agglomeration of ultrafine magnetic particles even when there is no applied magnetic field. This desirable superparamagnetic or near-superparamagnetic structure, having a reduced tendency to agglomerate, is obtained when the dimension of a ferromagnetic coating is made relatively small, e.g., with the average thickness of less than 30 nm, advantageously less than 10 nm, and more advantageously less than 3 nm. (Near-superparamagnetic is defined as having reduced magnetic coercivity and remanent induction, i.e., reduced by at least 30% as compared to the completely ferromagnetic structure.) The critical dimension determining the transition from the ferromagnetic to superparamagnetic behavior depends on each specific magnetic materials used, e.g., on magnetic anisotropy constant or magnetic saturation. (See B. D. Cullity, "Introduction to Magnetic Materials", Addison-Wesley, 1972, page 410.) When an external magnetic: field is applied to a superparamagnetic coating on a nanowire, the coating exhibits strong magnetization and aligns its length to the direction of the applied field.

The magnetic material provided on the nanowires does not necessarily have to be in the form of a coating covering the outside surface of the nanowire. In the case of nanotube materials such as carbon nanotubes, it is possible for at least a portion of the magnetic material to be present inside the nanotubes, either in the form of inner tubes or in the form of rods partially of completely filling the nanotubes. For example, a magnetic material of nickel can be placed inside carbon nanotubes as demonstrated by M. Terrones, MRS Bulletin Vol.24, No. 8, August 1999, page 43. The invention is applicable to such interior coated nanotubes, and the term coated nanowires, as used herein, is intended to encompass such interior coated nanotubes.

Figure 1D:
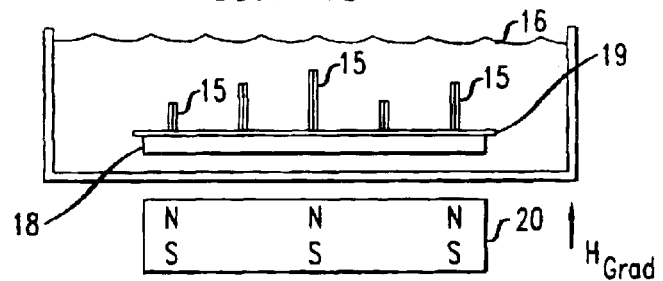

The next step, reflected in FIG. 1D, is to magnetically align the coated nanowires 15. Because of the tendency to reduce magnetostatic energy, movable elongated magnetic bodies in a liquid medium are aligned along the direction of applied magnetic field, and tend to have a parallel, laterally-spaced alignment structure as a result of repulsion by neighboring magnetic dipoles. See, e.g., S. Jin et al, *Science*, Vol.255, 446 (1992), and S. Jin et al., *J. Appl, Phys*., Vol. 64, 6008 (1988). Too high a volume fraction of nanowires in the composite structure should be avoided in order to reduce magnetic agglomeration. The desired volume fraction of the nanowires in the composite is less than 50%, advantageously less than 30%, more advantageously less than 10%.

For magnetic alignment, a gradient magnetic field is advantageous, as compared to a uniform magnetic field (although it is possible to use either, type). Optionally, a uniform magnetic field is used as a part of transient processing before the gradient field is applied. The gradient magnetic field is advantageous in that such a field both aligns the nanowires 15 and also pulls their tips to and against a smooth surface (whether flat or concave), as reflected in FIG. 1D. By drawing the nanowires to the substrate 18 surface, it is possible to provide relatively uniform height of the nanowires in the final composite structure. Such uniformity is desirable, as discussed above. The desired strength of the magnetic field near the nanowire tip being pulled to the substrate 18 is typically in the range of 10 to 10,000 Oe, advantageously 100 to 5000 Oe. The desired field gradient is typically at least 10 Oe per inch of vertical distance and advantageously 100 Oe per inch.

The gradient magnetic field is provided by any suitable method. For example, it is possible to place one or more permanent magnets 20 near the bath containing the dispersed nanowires, e.g., below, alongside, or in the middle of the bath. In the latter case, it is possible to immerse a multiplicity of substrates in the bath for simultaneous deposition. As is well known, the strength of the magnetic field from the pole of a permanent magnet decreases as a finction of the distance away from the pole face, generally following the inverse square relationship. Therefore, there is a gradient field present near the pole face, which is able to be utilized for fabrication according to the invention. The strength of the gradient magnetic field is adjusted as needed, e.g., by changing the magnet material, by changing the magnet dimension, or by altering the gap between the pole face and the nanowire-collecting substrate. Instead of a permanent magnet, it is also possible to use an electromagnet to provide the gradient field—the gradient field near the solenoid edge is able to be utilized. Alternatively, a more controllable gradient is obtained by using a solenoid with a gradient winding (i.e., nonuniform distribution of the number of turns of conductor winding along the length of the solenoid) or by using a segmented solenoid with a gradually varying magnitude of the applied electric current.

The substrate 18 against which the nanowires 15 are aligned is advantageously able to be easily peeled from the nanowires after the magnetic alignment and consolidation process. For example, it is possible to use a flexible substrate or a coating easily separable from the substrate, e.g., Teflon™ or grease. Alternatively, it is possible to place a thin, peelable mid-layer 19 such as Teflon™ tape or wax paper over the substrate surface.

Figure 1E:
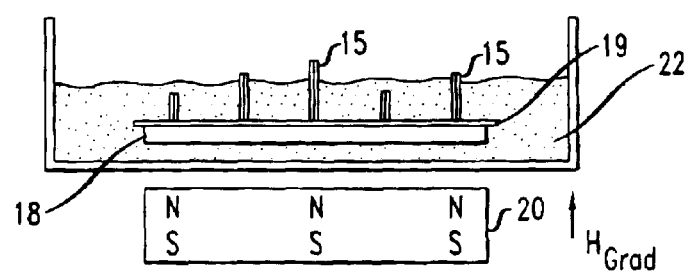

The next step, illustrated in FIG. 1E, is to let the liquid carrier (i.e., water or solvent) of the medium 16 evaporate while maintaining the magnetic field, e.g., at room temperature or, to accelerate the process, at a higher temperature (but below the boiling point of the liquid so as not to disturb the aligned nanowire structure). The dried medium 22 with aligned nanowires 15 and a conductive precursor, e.g., a metal salt, is then peeled off the substrate 18, and treated, e.g., baked or sintered in an inert or reducing atmosphere, to obtain a conductive supporting matrix 24 which secures the aligned nanowires 15. In the case of polymer-based binders, adhesives, or conductive polymers, instead of the metal salts, the decomposition heat treatment is generally omitted in favor of a curing step.

Figure 1F:
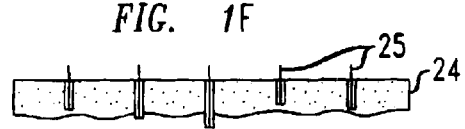

The final processing step, illustrated in FIG. 1F, is to etch, e.g., by acid dissolution, ion milling (e.g., ion etching), laser beam scanning, evaporation, or other techniques, a thin layer of the matrix material 24, e.g., the metal or the conductive polymer, from the surface of the composite that contacted the supporting substrate 18 during alignment (i.e., the bottom face of the composite in FIG. 1E). The etching step provides protruding nanowires 25 with relatively equal heights, as illustrated by FIG. 1F. As further reflected in FIG. 1F, it is also possible to remove the-magnetic coating from the protruding portions of the nanowires 25. Removal of the coating is advantageous in that the overall tip diameter is thereby reduced, which provides an electric field enhancement. It is also possible to horizontally polish or section the composite, followed by etching of a thin layer of the matrix material.

The desired protrusion height of the nanowires above the matrix for field emitter use is at least twice the diameter of the nanowire, advantageously at least 20 nm, more advantageously at least 100 nm, to provide efficient field concentration at the nanowire tip. The process of the invention is advantageous in that the exposed tip height is substantially uniform, with the variation of average protrusion height typically being less than 40%, advantageously less than 20%. The volume of nanotubes is typically at least 0.01 vol. %, advantageously at least 1 vol. %, to a depth of at least 2 $\mu$m from the surface from which the nanowires protrude.

Figure 2A:
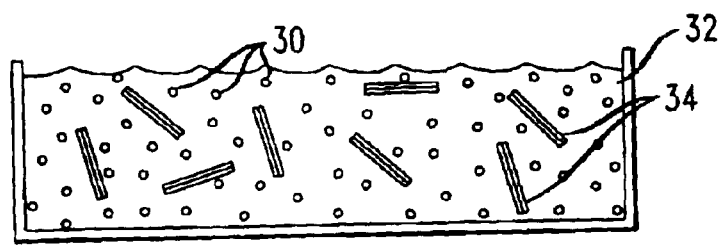
FIGS. 2A and 2B illustrate another embodiment for fabricating a field emitter structure according to the invention.
Figure 2B:
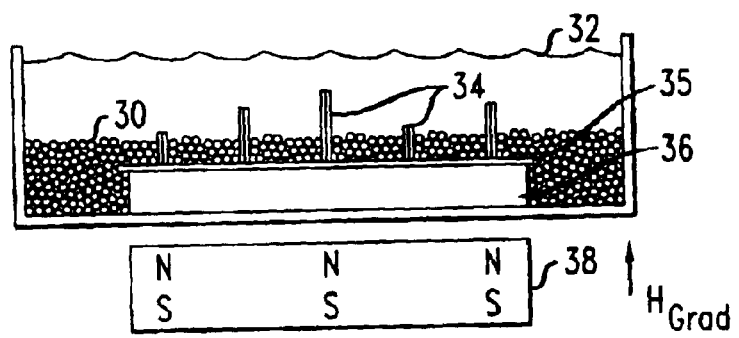

While the embodiment of FIGS. 1A–1F provides a matrix precursor through dissolution in a liquid carrier, e.g., a solvent with dissolved conducting polymer or an aqueous solution with dissolved metal salt, it is also possible to use an ultrafine particulate precursor 30, as reflected in FIGS. 2A and 2B. Specifically, as shown in FIG. 2A, a liquid carrier 32 (water or solvent) containing the magnetic-coated nanowires 34 is mixed with nano-scale particles of metal or metal precursor 30 such as Ag, Cu, Ni, Fe, Au, CuO, $Fe_2O_3$, AgO are added. (Other precursor materials, as discussed above, are also possible.) Vigorous mixing is advantageous for uniform dispersion. Such nano-scale metal, oxide, or other compound particles are commercially available. The desired particle size (e.g., diameter) is in the range of 1–1000 nm, advantageously in the range of 2–50 nm. It is generally advantageous to utilize as-synthesized particles, e.g., chemically precipitated particles, kept in their liquid medium without drying and exposure to air. Such use reduces both particle agglomeration and oxidation of the particles (some of which may be pyrophoric)

The mixture is then subjected to the gradient field processing, e.g., by a magnet 38, as reflected in FIG. 2B, to align the nanowires 34 and pull them against a flat or curved surface 36, as discussed above. The precursor nanoparticles 30 are allowed to settle, as shown in FIG. 2B. The composite is then dried into a solid body in the presence of the magnetic field, taken off the substrate, e.g., by use of a release tape layer 36, and treated to form a consolidated matrix Depending on the particular precursor, such treatments include decomposition, e.g., to reduce oxide or salt particulates into a metal), sintering, and/or curing. Additional consolidation is also possible, e.g., melting or plastically deforming the composite. The composite is then subjected to a surface etching process to allow the nanowires to protrude with relatively uniform tip height, as discussed above.

Figure 3:
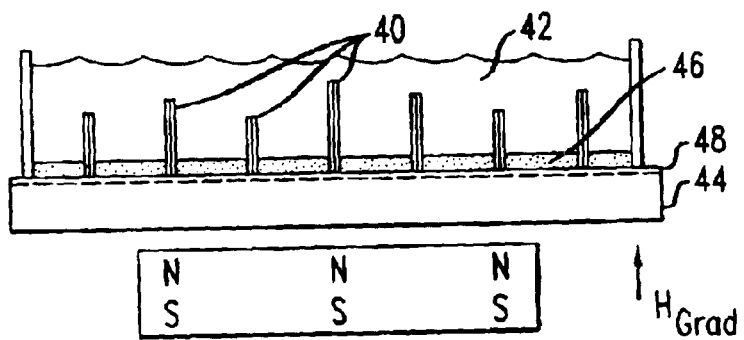
FIG. 3 illustrates a technique for creating protruding, uniform-height, nanowire tips in a field emitter structure according to the invention.

FIG. 3 illustrates another technique for fabricating a magnetically aligned nanowire structure. Magnetically coated nanowires 40 are mixed with a liquid carrier 42 containing a precursor material capable of being converted to a solid conductive matrix (e.g., metal or conducting polymer). The nanowires 40 are aligned in a gradient against a flat substrate 44 surface as discussed above. A relatively uniform, thin, soft, gel-like layer 46 is provide on the substrate 44 surface before the magnetic field alignment process is initiated. The magnetic gradient force pulls down the vertically aligned nanowires 40 against the substrate 44 so that the bottom ends of the nanowires 40 penetrate the gel-like layer 46 and substantially contact the underlying substrate 44. The precursor conductor material in the liquid 42 surrounds the remaining, exposed length of the nanowires 40, but does not penetrate the gel 46. The precursor material is then solidified. Upon detaching the solidified composite from the substrate, e.g., by using a peelable mid-layer 48 as described earlier, substantially uniform protrusion of the nanowires is obtained upon removal of the gel layer. (Such detachment from the gel-like layer is considered herein to constitute exposure of protruding tips.) The remainder of the fabrication process is as described above. Any remaining debris or remaining gel-like material on the nanowire tips is washed or dissolved away by later processing steps.

It is possible for the gel-like layer 46 to be formed from any of a number of different types of organic or inorganic materials that are substantially insoluble in the particular liquid solution containing the nanowires. For example, materials such as gelatin, honey, or uncured polymer are suitably used. The material is coated onto a substrate as a thin layer by known techniques such as spin-coating, spray coating, or doctor-blade coating. It is also possible to use solvent-diluted gel materials to obtain a very thin layer, through evaporation of the solvent. By controlling the thickness of this gel-like layer, the extent of tip protrusion is similarly controlled. The advantage of this embodiment is that the desired nanowire protrusion is achieved without the need for a surface etching step of the type discussed herein.

Another processing approach to obtain the desired protrusion without an etching step is sequential stacking of different types of materials. Specifically, the nanowires in a liquid carrier such as water or solvent (e.g., ethanol), without conductive precursor material, are magnetically aligned as discussed above, and the liquid is optionally allowed to evaporate away. While maintaining the gradient magnetic field to hold the aligned nanowires in place, a removable layer (e.g., a solvent-diluted gel-like liquid) or a layer of substantially spherical nanoparticles (e.g., a dilute dispersion of 1–5 nm diameter particles of $Al_2O_3$ or Ag in ethanol) is slowly and carefully poured over the aligned nanotubes, advantageously starting from the side of the aligned nanowire aggregate so that the liquid level rises to soak and cover the bottom portion of the nanowires. The solvent is then partially or completely evaporated to form a thin barrier layer. A precursor conductor material is then added and solidified. Upon release of the resulting nanowire composite from the substrate, the removable layer or layer of nanoparticles is removed or falls away to expose nanowire tips having substantially uniform height, as discussed above.

Figure 4A:
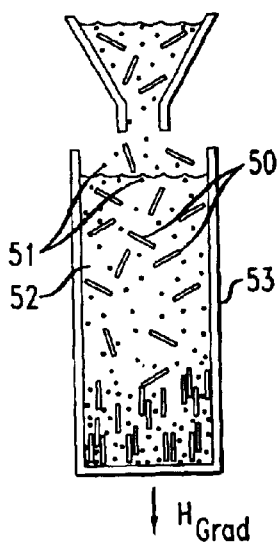
FIGS. 4A–4C illustrate the fabrication of an array of field emitters according to the invention.
Figure 4B:
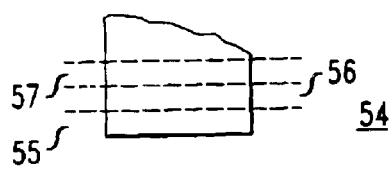
Figure 4C:

Another approach to obtain a bulk, aligned nanowire structure according to the invention is illustrated in FIGS. 4A–4C. Specifically, nanowires 50 are first mixed with a precursor conductive material 51, e.g., conducting metal nanoparticles, precursor metal-salt particles (or a solution thereof), metal-oxide particles, or conductive polymer (intrinsic or metal-filled), along with an aqueous or non-aqueous liquid carrier 52. The resulting slurry is placed in a long vertical tube 53, e.g., a copper or plastic tube. After mixing of the slurry, a vertical, gradient magnetic field is applied to draw the magnetic-coated nanowires 50 to the bottom, together with the conductor or precursor conductor 51, as shown in FIG. 4A. The speed of nanowire 50 movement and the alignment pile up at the bottom is controlled by adjusting the strengths of the magnetic field and the gradient, by altering materials parameters such as the volume fraction, size, or viscosity of the materials involved, and/or by changing the nature of the magnetic coating. The speed of the nanowire 50 movement is selected to allow simultaneous sedimentation of the conductor particulates 51 by gravity. At the top area of the processing apparatus, additional nanowires 50 and conductor material 51 are replenished, if needed, as the aligned materials are accumulated at the bottom. After the process of nanowire alignment and packing of the tube is completed, the liquid carrier 52 is evaporated, and the composite structure is consolidated by sintering, melting, and/or plastic deformation in the case of metal conductor matrix, or by drying and/or curing in the case of a polymer-based conductor matrix. The resultant solid rod material 64 is then sectioned into numerous emitter bodies 55, 56, 57 with any desired thickness, as shown in FIG. 4B. One of the surfaces of each sectioned body 59 is then lightly etched, as discussed above, to provide protruding nanowire tips 58, as illustrated in FIG. 4C.

Figure 5A:
FIGS. 5A and 5B illustrate an embodiment for preparing a multiplicity of emitters according to the invention.
Figure 5B:
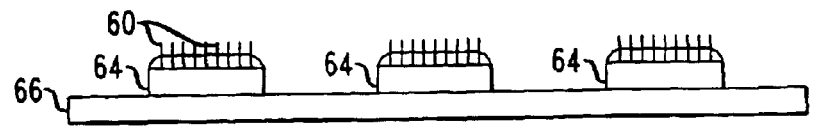

For certain applications, such as flat panel displays, an x-y matrix array of many subdivided regions of emitters (pixels) is required. Such an array of nanowires with their tips vertically aligned and protruding for efficient field emission is fabricated according to the invention as illustrated in FIGS. 5A and 5B. Specifically, a low-viscosity slurry 60 of magnetically-coated nanowires 62, one or more conducting materials (such as silver-epoxy, silver paste, conducting polymer, or solder alloy particles), and a liquid carrier such as alcohol is dispensed as a thin layer on pre-defined array contact pads 64 located on a substrate 66, e.g., 100 μm×100 μm pads, using dispensing and patterning techniques such as spin coating, through-mask spray coating, or screen printing, as shown in FIG. 6A. It is also possible to use a photo-definable polymer as the base carrier liquid for post-processing definition of the array structure. The magnetically-coated nanowires 62 in the deposited slurry layer are then vertically aligned as parallel rods by applying a magnetic field. The slurry 60 is then dried and the remaining constituents consolidated. When solder particles are utilized in the slurry, consolidation generally involves a melting or sintering step (typically in the presence of the magnetic field) to induce bonding to the contact pad (which typically contains a solder bondable surface) and to lock the aligned nanowires in place. Due to the nature of the slurry, upon removal of the liquid and consolidation of the remaining components, at least a portion of the nanowires 60 will protrude from the consolidated material, as reflected in FIG. 6B. The degree of protrusion is at least somewhat controllable by altering the thickness of the deposited slurry, by changing the degree of dilution of the slurry, and/or by adjusting the magnetic field intensity. Advantageously, the solvent is evaporated while maintaining the aligning magnetic field. In some cases, the process by which the solvent is removed will also be suitable for introducing protrusion of the nanowires. The desired thickness of the nanowire array depends on the average length of the starting nanowire material. The typical average length of the nanowires for use in an array is in the range of 0.1 to 100 μm, advantageously 0.5–20 μm, with the typical spread in length distribution being less than a factor of 5, advantageously less than a factor of 2. The desired degree of protrusion is typically 0.1–10 μm, advantageously 0.1–1 μm. It is possible to treat the surface of the processed nanowire array with a light etching with acid, solvent, plasma, or a laser to remove remnant, surface-covering atom layers of polymer or metal.

The aligned nanowire structure prepared according to the invention is assembled into a configuration for field emission devices by incorporating grid, anode, phosphor (for displays) and other components including electrical, vacuum-related, and structural parts, as discussed herein.

Devices Incorporating Nanowire Emitter Structures

The emitter structures formed as discussed above are useful for a variety of devices, including microwave vacuum tube devices and flat panel field emission devices. Because efficient electron emission at low applied voltages is typically achieved by the presence of accelerating gate electrode in close proximity to the emitting source (typically about 1–10 μm distance), it is advantageous to have numerous gate apertures in an emitter structure to enhance the capability of the structure. Specifically, a fine-scale, micron-sized gate structure with numerous gate apertures is advantageous for attaining high emission efficiency.

Accordingly, in the emission devices of the invention, a grid structure is formed in front of the nanowire emitter structure described herein. The grid is a conductive element placed between the electron emitting cathode and the anode. It is separated from the cathode but sufficiently close to the nanowire emitter to excite emissions (typically within 10 μm of the emitting nanowire tips), Yet, this close spacing is possible only if the emitter tips have relatively uniform height. As discussed previously, the fabrication process of the invention provides nanowire tips exhibiting such uniformity.

The grid is generally separated from the cathode by an electrically insulating layer such as aluminum oxide or silicon dioxide. Advantageously, the grid structure in the invention contains an electrically conducting layer, e.g., a thin film or thin foil, with a multitude of apertures. Within each aperture, a multiplicity of nanowires emit electrons when a field is applied between the cathode and the grid.

The dimension of the grid apertures is typically in the range of 0.05–100 μm in average maximum dimension (e.g., diameter), advantageously at least 0.1 μm, and more advantageously at least 0.2 μm to ease manufacturing. The average maximum dimension is advantageously no more than 20 μm, more advantageously no more than 5 μm in order to 1) increase the density of grid apertures, 2) increase the number of nanowire emitters within each aperture area, and 3) reduce the angular beam spread. It is possible for the grid aperture to be of any suitable shape, e.g., circular. The thickness of the grid conductor is typically in the range of 0.05–100 μm, advantageously 0.05–10 μm. The grid conductor material is typically chosen from metals such as Cu, Cr, Ni, Nb, Mo, W or alloys thereof, but the use of conductive ceramic materials such as oxides, nitrides, and carbides is also possible. The apertured (or perforated) grid structure is typically prepared by conventional thin film deposition and photolithographic etching.

Figure 6:
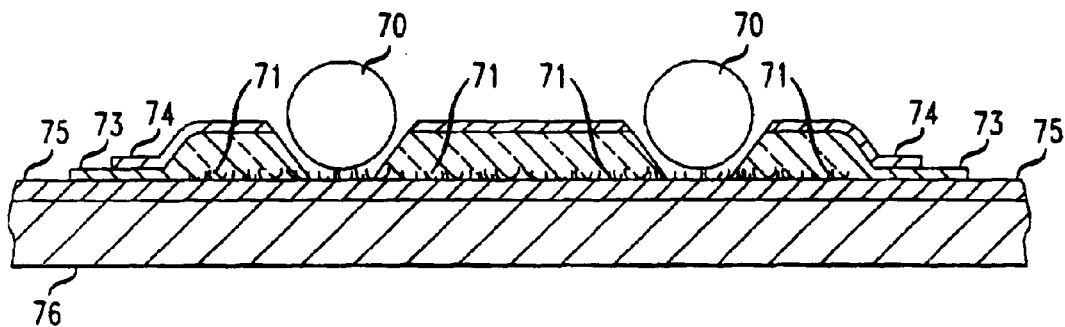
FIG. 6 illustrates formation of an apertured nanowire cathode structure according to the invention.

Advantageously the grid is a high density apertured gate structure such as described in U.S. Pat. Nos. 5,681,196 and 5,698,934, the disclosures of which are hereby incorporated by reference. The combination of very fine and high-density nanowire emitters with a high-density gate aperture structure is particularly advantageous with submicron emitters. Such a high density gate aperture structure is conveniently formed by utilizing micron or submicron sized particle masks. Specifically, after formation of the nanowire emitter structure, mask particles (metal, ceramic, or plastic particles typically having maximum dimensions less than 5 μm and advantageously less than 1 μm) are applied to the emitter surface, e.g., by spraying or sprinkling. A dielectric film layer such as $SiO_2$ or glass is deposited over the mask particles as by evaporation or sputtering. A conductive layer such as Cu or Cr is deposited on the dielectric. Because of the shadow effect, the emitter areas underneath each mask particle have no dielectric film. The mask particles are then easily brushed or blown away, leaving a gate electrode having a high density of apertures. FIG. 6 illustrates such a particle mask technique. The mask particles 70 are located above the protruding nanowire emitters 71. Upon deposition of the insulating layer 73 and the grid conductor layer 74 onto conductor 75 on substrate 76, the mask particles 70 block portions of the nanowire emitters 71. When the mask particles 70 are removed, nanowires 71 are exposed through the resultant apertures. The resultant structure is then capable of being incorporated into a device.

Figure 7:
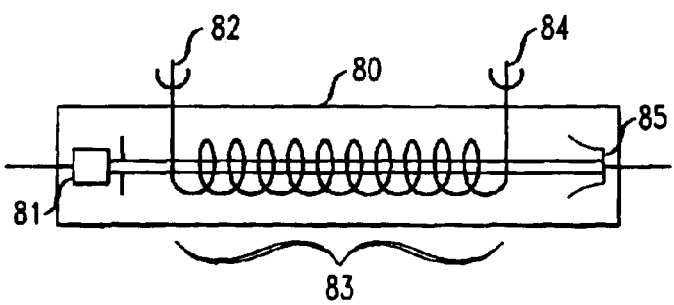
FIG. 7 illustrates a typical traveling wave tube (TWT) structure.

FIG. 7 is a schematic cross section of a typical microwave vacuum tube device—here a traveling wave tube (TWT). The tube device contains an evacuated tube 80, a source of electrons in the form of an electron gun 81, an input window 82 for introducing a microwave input signal, an interaction structure 83 where the electrons interact with the input signal, and a microwave output window 84 where microwave power derived from the electrons is taken out of the tube. In the case of a TWT, other components include a focusing magnet (not shown) to focus the beam of electrons through the interaction structure 83, a collector 85 to collect the electron beam after the output microwave power has been generated and an internal attenuator (not shown) to absorb microwave power reflected back into the tube from mismatches in the output. For a TWT, the interaction region 83 is typically a conductive helix for broadband applications and a coupled-cavity region for high power applications.

Figure 8:
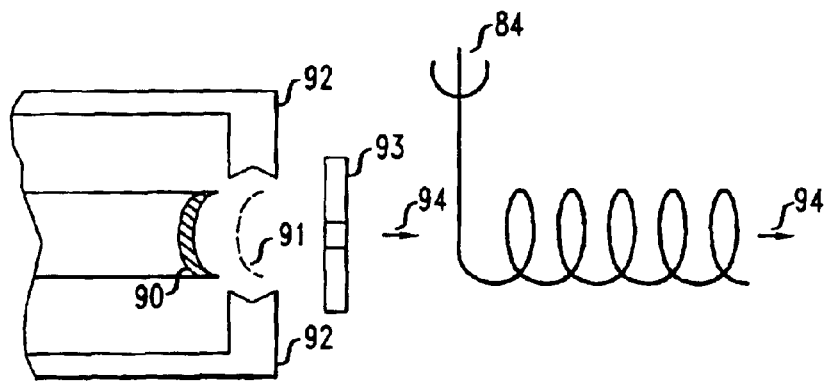
FIG. 8 illustrates the electron gun structure of the TWT of FIG. 7.

The electron gun 81 is an electron source that generates, accelerates and focuses an electron beam to follow a desired trajectory after it leaves the gun. FIG. 8 schematically illustrates a conventional electron gun comprising a thermionic cathode 90, one or more grids 91 for inducing emission of electrons, focusing electrodes 92 for focusing the electrons into a beam, and apertured anode 93 for further directing the beam 94 into interaction structure 83. For TWT applications, a long, thin electron beam at relatively low voltage and high current density is advantageous. Electron guns range in configuration from a planar cathode faced by a planar anode to more elaborate designs such as Pierce guns, conical diode electrodes, concentric cylinders or spherical cap cathodes. (See, e.g., A. W. Scott, supra.)

In operation of the device shown in FIGS. 7 and 8, an electron beam 94 is accelerated from the cathode 90 by high voltages applied to grids 91 and anode 93. The electron beam is then shot into the interaction structure 83 where it interacts with the microwave input signal such that the beam 94 is amplified as the electrons and the signal travel together through the interaction structure 83. The electrons advantageously travel at the same velocity as the microwave signal on the interaction structure 83. The power of the input signal modulates the electron beam 94, and the modulated electron beam 94 generates an amplified form of the input signal at the out-put 84.

The cathode 90 and grid 91 are the source of electrons for the electron beam in the TWT of FIG. 6. The cathode advantageously has the following properties and capabilities: (1) exhibit a surface able to emit electrons freely without the necessity of external excitation such as heating or bombardment, (2) supply a high current density, (3) long operating life with its electron emission continuing substantially unimpaired, (4) allow production of a narrow beam with a small spread in electron momentum, and (5) allow production of a modulated electron beam at or near the cathode. In contrast to conventional thermionic cathodes, cold cathodes comprising protruding nanowire emitters exhibit these properties. Specifically, nanowire-based cold cathodes are capable of fast, room-temperature emission when an electric field is applied. They allow the production of a modulated electron beam over a distance of a few microns (as in the case of beam modulation performed directly by the grids), permitting the use of a shortened interaction region and resulting in a lighter, more compact device.

When using nanowire-based cold cathodes in microwave vacuum tube devices, it is desired to keep electron beam spread within a reasonable level. Electrons emerge from the cathode surface with a nonvelocity and at various angles to the surface normal. The field-emitted electrons thus have a distribution of momentum values in the direction of electron beam trajectory. These effects—random emission of electrons, undesirable momentum perpendicular to the path from the cathode to the anode and the resulting crossing of electron trajectories on the microscopic scale—all reduce the performance of the microwave amplifier by giving rise to shot noise as well as the minimum diameter that a convergent beam can attain. It is therefore desirable to inhibit electron beams from different apertures in the grid from merging unless the electron beams are nearly parallel. Specifically, if the beams merge while individually diverging, the phase space density of the resultant beam will be lowered, because at any given point electrons are found with a variety of different momenta.

It is possible to reduce the divergence angle of the electrons from each aperture by creating an electrostatic lens in the aperture. However, Liouville's Theorem constrains the extent to which a lens is able to reduce the perpendicular momentum spread. If the emitting area is equal to the lens aperture, then no substantial improvement is obtained. If the emitting area is smaller than the lens aperture, it is possible to reduce the perpendicular momentum distribution (with proper lens design) by the ratio of the radius of the emitting area to the radius of the lens.

It is therefore desirable to allow emission only from small spots near the center of each aperture, i.e. at most 70% of the area and advantageously at most 50% of the area of the aperture. It is possible to control the emission by patterning the substrate so that for a plurality of the emitting apertures, only a small area (smaller than the aperture area) is electrically conductive. It is also possible by controlling nanowire incorporation process so that only: the central area within the emitting aperture is activated and emits electrons, e.g., by depositing a non-emissive overlayer on the nanowire emitters everywhere but at the center of the apertures.

Figure 9:
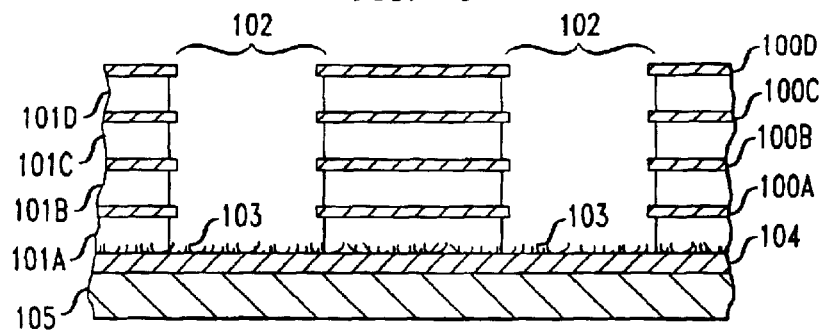
FIG. 9 illustrates a multiple grid structure for extracting, accelerating and focusing an electron beam from a nanowire cathode surface according to the invention.

The invention provides an improved technique for reducing the divergence angle. According to the invention, a multilayer, apertured grid is used in which the first grid is operated at a negative potential. The first grid is typically 0.05 to 10 of its average maximum aperture dimension (e.g., diameter in the case of round apertures) above the cathode, advantageously 0.3 to 2. Typically, the apertures are round and have a diameter of 0.05 to 100 $\mu$m, advantageously at least 0.1 $\mu$m, more advantageously at least 0.2 $\mu$m. This first grid reduces the electric field at the cathode surface, near the edge of the hole, and thereby suppresses emission preferentially from the edge. Successive grids typically exhibit positive voltages relative to the cathode. The multilayer grid structure has at least two layers and advantageously at least 4 layers of grid conductors, as illustrated in FIG. 9. Grid conductors 100A, 100B, 100C, 100D are separated by insulators 101A, 101B, 101C, 101D, and define aligned apertures 102. Nanowire emitters 103 located within each aperture 102 are supported by a cathode conductor 104, which is located on a substrate 105. The grid conductors 100A–100D allow the electron beams to be focused during traveling. The first grid layer closest to the emitters (100A) is generally biased negative to reduce the perpendicular momentum through suppression of field emission near the edge of the grid apertures 102. A negative bias on the first grid also focuses a diverging electron beam into one that has momenta more nearly parallel to the surface normal. (A single grid provides similarly useful properties if the field applied by the anode is sufficiently large to force emission even in the presence of a negatively charged grid. However, multiple grids are advantageous in reducing the required voltage on the anode and in providing a better collimated electron beam.)

The multilayered grid structure is prepared by conventional thin film deposition and photolithographic techniques. It is also possible to prepare the grid structures of FIG. 9 by a particle mask technique as discussed previously, as illustrated in FIGS. 10 and 11. The thickness of the grid conductor layers 100A–100D is typically in the range of 0.05 to 100 $\mu$m, advantageously 0.1 to 10 $\mu$m. The grid conductor layers are generally selected from a metal such as Cu, Cr, Ni, Nb, Mo, W, or alloys thereof, but the use of conductive ceramics such as oxides, nitrides, and carbides is also possible. The insulator layers 101A–101D are typically formed from materials such as silica or glass.

Figure 10:
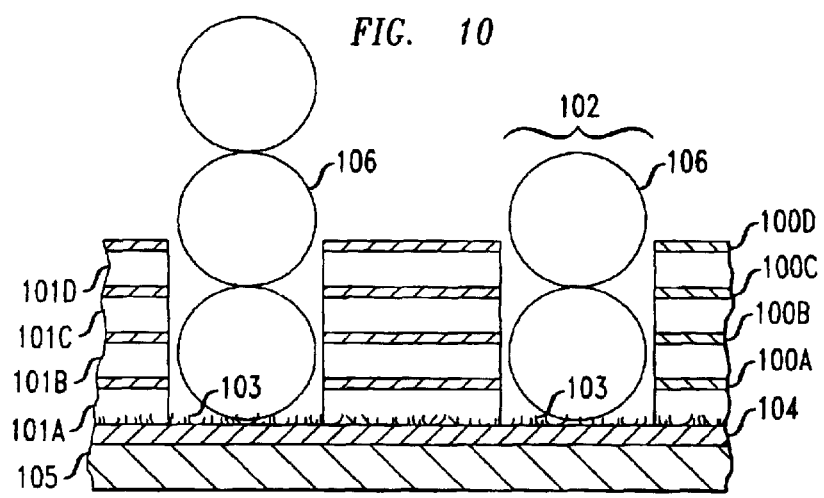
FIG. 10 illustrates the preparation of a multilayer grid structure according to the invention.

In FIG. 10, the mask particles 106 are typically ferromagnetic (e.g. Fe, Ni, Co, or their alloys). Desirable particle size is typically in the range of 0.1–20 $\mu$m in average diameter. During the placement of the particles, e.g. by sprinkling onto the nanowire emitter structure, a vertical magnetic field is applied, which causes the ferromagnetic particles 106 to form a vertically elongated chain-of-spheres containing at least 2 particles. Some chains-of-spheres may have more particles than others, but this does not matter for the purpose of depositing the multilayer grid structure. After alternating deposition of insulating spacer film (101A–101D) and the grid conductor film (100A–100D) into multilayer stacks, the ferromagnetic particles 106 are removed, e.g., by magnetically pulling away using a permanent magnet, or by chemical etching.

Figure 11:
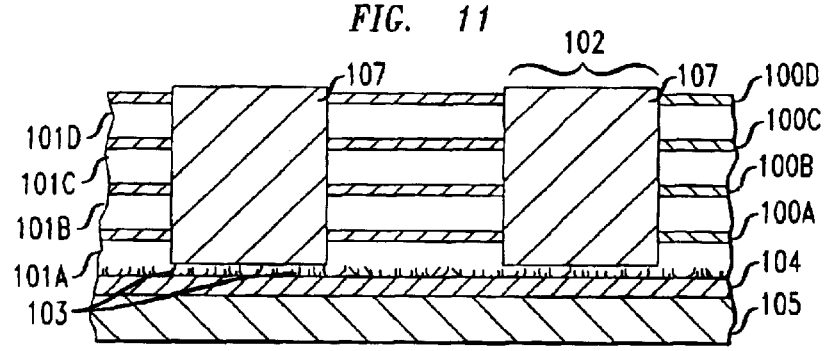
FIG. 11 illustrates another technique for preparation of a multilayer grid structure according to the invention.

An alternative particle mask approach is schematically illustrated in FIG. 11. In this alternative approach, elongated or prolate ferromagnetic particles 107 are sprinkled in the presence of vertical magnetic field so that they stand up vertically to serve as mask particles during the deposition of the multilayer grid structure (100A–100D and 101A–101D) on substrate 105, conductor layer 104 and nanowire emitters 103. The particle mask is then removed as discussed previously. The elongated mask particles 107 typically have an average axial maximum dimension, e.g., diameter, in the range of 0.1–20 $\mu$m. It is possible to prepare the particles 107, for example, by thin film deposition (e.g. by sputtering, evaporation, electroless plating) of the mask material through a perforated template (not shown) placed at a desired height above the nanowire emitters. Suitable materials for the elongated mask particles 107 include metals such as Cu, Al, Ni, easily water or solvent dissolvable polymers (e.g., polyvinyl acetate, polyvinyl alcohol, polyacrylamide, acrylonitrile-butadiene-styrene or ABS), volatile polymers (e.g., PMMA), or easily dissolvable salts (e.g., NaCl). After deposition of the particles, the template is removed, and the multilayer grid structure formed.

The cathode and gate structure of FIG. 9, as used in a microwave amplifier, is not necessarily flat in surface geometry. It is possible to use a reshaped bulk nanowire composite emitter, or a curved substrate having thin film array emitters deposited thereon. The curved substrate is prepared, for example, by etching or mechanical polishing (e.g., in the case of materials such as Si) or by plastic deformation (e.g., in the case of ductile metals such ad Cu, Mo, Nb, W, Fe, Ni, or alloys thereof).

Advantageously, the nanowire-containing cathode and multilayer grid structure of FIG. 9 is used in a TWT, instead of a thermionic emission cathode. Also, the cathode/grid structure of FIG. 9 is advantageously slightly concave for focusing the emitted electrons into a beam.

The nanowire emitter structure of FIG. 9 reduces the perpendicular momentum spread of electrons emitting from the cathode due to four features. (1) Low voltage emission is desirable to have reduced beam spreading. If the emitter geometry is held constant, the perpendicular momentum spread scales as the square root of the emission voltage. The use of protruding nanowire emitters allows low voltage emission and hence reduced perpendicular momentum in microwave amplifier operation. (2) Electron emission is restricted to the central area portion, which is much smaller than the entire grid aperture area. (3) The electron beam is focused by the stack of the multilayer grid structure. (4) A concave substrate further focuses the electron beam.

It is also possible to use the nanowire-based emitters of the invention to fabricate a flat panel, field emission display. Such a field emission display is constructed, for example, with a diode design (i.e., cathode-anode configuration) or a triode design (i.e., cathode-grid-anode configuration). Advantageously, a grid electrode is used, more advantageously a high density aperture gate structure placed in proximity to the nanowire emitter cathode, as discussed previously.

For display applications, emitter material (the cold cathode) in each pixel of the display desirably consists of multiple emitters for the purpose, among others, of averaging out the emission characteristics and ensuring uniformity in display quality. Because of the nanoscopic nature of the nanowires, the emitter provides many emitting points, typically more than $10^4$ emitting tips per pixel of $100\times100$ $\mu$m$^2$, assuming 50% nanowire density with a tubule diameter of 10–100 nm. Advantageously, the emitter density in the invention is at least 1/$\mu$m$^2$, more advantageously at least 10/$\mu$m$^2$. Because efficient electron emission at low applied voltage is typically achieved by the presence of accelerating gate electrode in close proximity (typically about 1 micron distance), it is useful to have multiple gate apertures over a given emitter area to utilize the capability of multiple emitters. It is also desirable to have fine-scale, micron-sized structure with as many gate apertures as possible for increased emission efficiency.

Figure 12:
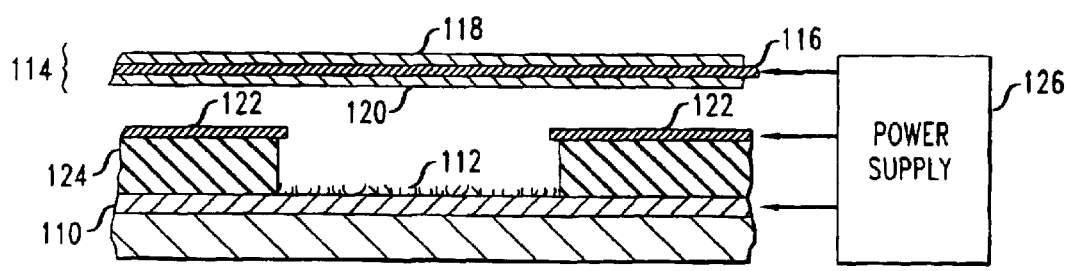
FIG. 12 illustrates a flat panel field emission display comprising a nanowire emitter structure according to the invention.

FIG. 12 illustrates a flat panel field emission display using a nanowire emitter structure of the invention. The display contains a cathode 110 including a plurality of nanowire emitters 112 and an anode 114 disposed in spaced relations from the emitters 112 within a vacuum seal. The anode conductor 116 formed on a transparent insulating substrate 118 is provided with a phosphor layer 120 and mounted on support pillars (not shown). Between the cathode and the anode and closely spaced from the emitters is a perforated conductive gate layer 122. Conveniently, the gate 122 is spaced from the cathode 110 by an insulating layer 124.

The space between the anode and the emitter is sealed and evacuated, and voltage is applied by power supply 126. The field-emitted electrons from the nanowire emitters 112 are accelerated by the gate electrode 122, and move toward the anode conductor layer 116 (typically a transparent conductor such as indium-tin oxide). As the accelerated electrons hit the phosphor layer 120, a display image is generated.

Other embodiments of the invention will be apparent to those skilled in the art from consideration of the specification and practice of the invention disclosed herein.

What is claimed is:

1. A device comprising:
   a composite material comprising aligned nanowires at least partially coated with a magnetic material, wherein the nanowires are electrically connected by at least one of contact among the nanowires and a conductive material present in the composite material, wherein at least a portion of the nanowires protrude from a surface of the composite material by an average protrusion of at least twice the average diameter of the nanowires, and wherein the nanowires have an average length of about 0.1 $\mu$m to about 10,000 $\mu$m.

2. The device of claim 1, wherein the device is an electron field emission device.

3. The device of claim 1, wherein the protruding nanowires comprise broken ends.

4. The device of claim 1, wherein the magnetic material comprises less than about 0.95 vol. % of the coated nanowires.

5. The device of claim 4, wherein the magnetic material comprises less than about 0.75 vol. % of the coated nanowires.

6. The device of claim 1, wherein the average protrusion height is at least 20 nm.

7. The device of claim 6, wherein average protrusion height is at least 100 nm.

8. The device of claim 1, wherein the composite material comprises at least 1 vol. % nanowires to a depth of at least 2 μm from the surface from which the nanowires protrude.

9. The device of claim 1, wherein the variation in average protrusion height is less than 40%.

10. The device of claim 1, wherein the composite material comprises the conductive material.

11. The device of claim 1, wherein the composite material is disposed on a substrate as an arrayed emitter structure.

12. The device of claim 1, wherein the composite material is part of an emitter structure, and wherein the device further comprises an apertured grid located over at least a portion of the composite material, the grid comprising a grid layer and an insulating layer.

13. The device of claim 1, wherein the composite material is part of an emitter structure, and wherein the device further comprises an apertured grid located over at least a portion of the emitters, the grid comprising at least a first and a second grid conductor layer, the first grid conductor layer separated from the emitter structure by a first insulating layer, and the first and second grid conductor layers separated by a second insulating layer.

14. The device of claim 13, wherein the apertured grid further comprises third and fourth grid conductor layers, the third grid conductor layer separated from the second grid conductor layer by a third insulating layer, and the fourth grid conductor layer separated from the third grid conductor layer by a fourth insulating layer.

15. The device of claim 1, wherein the nanowires are selected from carbon, silicon, and germanium.

16. The device of claim 15, wherein the nanowires are carbon nanotubes and at least a portion of the magnetic material is present in the interior of the nanotubes.

17. The device of claim 1, wherein the magnetic material is selected from the group consisting of ferromagnetic and, ferrimagnetic coating structures.

18. The device of claim 1, wherein the magnetic material is selected from the group consisting of near-superparamagnetic and superparamagnetic coating structures.

19. A device comprising:

a composite material comprising aligned nanowires at least partially coated by a magnetic material, wherein the nanowires are electrically connected by at least one of contact among the nanowires and a conductive material present in the composite material, wherein at least a portion of the nanowires protrude from a surface of the composite material by an average protrusion of at least twice the average diameter of the nanowires, and wherein the nanowires have an average length of about 0.1 μm to about 10,000 μm, and further wherein the nanowires have an average protrusion height of at least 20 nm.

20. A device according to claim 19, wherein the nanowires have an average protrusion height of at least 100 nm.

21. A device according to claim 19, wherein the composite material comprises at least 1 vol. % nanowires to a depth of at least 2 μm from the surface from which the nanowires protrude.

22. A device comprising:

a composite material including aligned nanowires dispersed in a continuous phase, the continuous phase being selected from a group consisting of polymeric materials and metals and the nanowires being at least partially coated with an exterior layer of a magnetic material, the exterior layer having an average thickness of at least about 0.1 nm, wherein electrical connection between the nanowires is provided by direct contact among the nanowires or through a conductive material incorporated in the composite material, and further wherein at least a portion of the nanowires protrude from a surface of the composite material by an average protrusion of at least twice the average diameter of the nanowires, and wherein the nanowires have an average length of about 0.1 μm to about 10,000 μm.

* * * * *